US009884788B2

(12) United States Patent
Tsakalakos et al.

(10) Patent No.: US 9,884,788 B2
(45) Date of Patent: Feb. 6, 2018

(54) METHOD FOR PRODUCING LOW POROSITY NONOXIDE CERAMICS

(71) Applicants: Thomas Tsakalakos, Piscataway, NJ (US); Enver K. Akdogan, Piscataway, NJ (US); Ilyas Savkliyildiz, Piscataway, NJ (US); Hulya Bicer, Piscataway, NJ (US); Lawrence Kabacoff, Piscataway, NJ (US); Bart Visser, Piscataway, NJ (US); William Paxton, Piscataway, NJ (US)

(72) Inventors: Thomas Tsakalakos, Piscataway, NJ (US); Enver K. Akdogan, Piscataway, NJ (US); Ilyas Savkliyildiz, Piscataway, NJ (US); Hulya Bicer, Piscataway, NJ (US); Lawrence Kabacoff, Piscataway, NJ (US); Bart Visser, Piscataway, NJ (US); William Paxton, Piscataway, NJ (US)

(73) Assignees: RUTGERS, THE STATE UNIVERSITY OF NEW JERSEY, New Brunswick, NJ (US); OFFICE OF NAVAL RESEARCH, Arlington, VA (US)

(*) Notice: Subject to any disclaimer, the term of this patent is extended or adjusted under 35 U.S.C. 154(b) by 395 days.

(21) Appl. No.: 14/611,942

(22) Filed: Feb. 2, 2015

(65) Prior Publication Data

US 2016/0016857 A1    Jan. 21, 2016

Related U.S. Application Data

(60) Provisional application No. 61/934,243, filed on Jan. 31, 2014.

(51) Int. Cl.
C04B 35/64       (2006.01)
C04B 35/515      (2006.01)
(Continued)

(52) U.S. Cl.
CPC .......... *C04B 35/563* (2013.01); *C04B 35/565* (2013.01); *C04B 35/5611* (2013.01);
(Continued)

(58) Field of Classification Search
CPC . C04B 35/563; C04B 35/565; C04B 35/5611; C04B 35/58057;
(Continued)

(56) References Cited

U.S. PATENT DOCUMENTS 8,340,755 B2    12/2012  Takiguchi
2013/0085055 A1  4/2013  Raj et al.
(Continued)

OTHER PUBLICATIONS

Zapata-Solvas et al. "Preliminary investigation of flash sintering of SiC". Journal of the European Ceramic Society 33 (2013) 2811-2816. (Year: 2013).*

*Primary Examiner* — Erin Snelting
(74) *Attorney, Agent, or Firm* — Fox Rothschild LLP

(57) ABSTRACT

The present invention relates to a method of producing ultra-high melting point nonoxide ceramics with low porosity based on sintering at low temperatures of below about 1000° C. with low DC electric fields of less than about 100 V/cm.

19 Claims, 8 Drawing Sheets

(51) Int. Cl.
*C04B 35/563* (2006.01)
*C04B 35/56* (2006.01)
*C04B 35/565* (2006.01)
*C04B 35/58* (2006.01)
*C04B 35/583* (2006.01)
*C04B 35/584* (2006.01)

(52) U.S. Cl.
CPC .......... *C04B 35/583* (2013.01); *C04B 35/584* (2013.01); *C04B 35/58057* (2013.01); *C04B 35/58071* (2013.01); *C04B 35/58078* (2013.01); *C04B 2235/5445* (2013.01); *C04B 2235/6562* (2013.01); *C04B 2235/6567* (2013.01); *C04B 2235/666* (2013.01); *C04B 2235/77* (2013.01)

(58) Field of Classification Search
CPC ........ C04B 35/56071; C04B 35/58078; C04B 35/583; C04B 35/584; C04B 2235/666
See application file for complete search history.

(56) References Cited

U.S. PATENT DOCUMENTS

2014/0072805 A1* 3/2014 Andreani .............. C04B 35/515
428/408
2014/0139768 A1 5/2014 Galstian et al.
2014/0306381 A1* 10/2014 Raj ....................... C04B 35/016
264/414

* cited by examiner

FIG. I

METHOD FOR PRODUCING LOW POROSITY NONOXIDE CERAMICS

CROSS-REFERENCE TO RELATED APPLICATIONS

This application claims priority under 35 USC §119(e) to U.S. Provisional Patent Application Ser. No. 61/934,243, filed on Jan. 31, 2014, which is hereby incorporated by reference in its entirety.

STATEMENT OF GOVERNMENT LICENSE RIGHTS

The present invention was made with government support under grant number N00014-10-1-042 awarded by the Office of Naval Research, U.S. Department of Defense. The United States government has certain rights in this invention.

FIELD OF THE INVENTION

The invention relates to a method of producing ultra-high melting point ceramics with low porosity. More particularly, the invention relates to a method of sintering ultrahigh melting temperature covalent nonoxide ceramics at low temperatures with low DC electric fields to produce high density ceramics with small grain size. In one embodiment, the invention relates to a method of sintering boron carbide ($B_4C$) ceramics at <1000° C. under controlled atmospheres with electric field intensities of <100 V/cm in <5 minutes (excluding heat up time), resulting in >95% sintered density within minutes.

BACKGROUND

Bulk and composite structural ceramics can be fabricated by forming particulate matter into a desired shape (pellet, plate, cylinder, ring, sphere, tube, etc.) and then by subjecting the formed body to high temperatures so as to induce densification. The process of creating objects from powders, including ceramic powders, is based on atomic diffusion and referred to as sintering. In most sintering processes, the powdered material is held in a mold and then heated to a temperature below the melting point, typically around ⅔ of the melting temperature of the ceramic of interest. The atoms in the powder particles diffuse across the boundaries of the particles and via mass transport of the particles create a dense solid piece. Ceramics cannot be cast as one does with metals because of their very high melting temperatures. However, because the sintering temperature does not have to reach the melting point of the material, sintering is often chosen as the shaping process for materials with extremely high melting points.

Although, sintering is effective in reducing the porosity and enhancing properties such as strength, electrical conductivity, translucency and thermal conductivity, of the ceramics, it is not perfect. Sintered ceramics still maintain some porosity which may be detrimental to their physical properties and limit their usability. The foremost requirement for any commercial sintering process is maximum density at the lowest temperature and shortest time possible.

Moreover, sintering of high melting temperature ceramics have traditionally been done using pressure assisted methods such as hot pressing or hot isostatic pressing (HIP) by employing pressures of up to ~250 MPa. For example, the typical hot pressing cycle for the sintering of boron carbide ($B_4C$) involves temperatures in the range of 1800-2200° C. for up to 40 hours under atmosphere control. Due to the need of specialized equipment and the extreme conditions required using pressure assisted methods, sintering of ultra-high melting temperature ceramics is cost prohibitive and difficult. Furthermore, most carbides, nitrides and boride decompose into their constituent oxides and require additional preventive steps during sintering at high temperatures mainly by controlling the atmosphere. Thus, the higher the temperature the more difficult it is to sinter the nonoxide ceramics.

U.S. Patent Publication No. 2013/0085055 entitled "Methods of Flash Sintering," (incorporated herein by reference in its entirety) describes a process of "flash densification" of dielectrics and semiconducting oxide ceramics, such as $Al_2O_3$, $Y_2O_3$-doped $ZrO_2$, $MnCoO_4$ and $SrTiO_3$. By virtue of the electronic structure in such materials, a large enough electric field can be maintained across the specimen while heating the ceramic to high temperatures. The effect of the electric field has been attributed to various mechanisms, including avalanche of charged defects, which all require the build-up of very high electric fields inside of the material. However, in nonoxide ceramics a very high electric field cannot be maintained inside the material due to electric conductivity of such materials and as governed by the laws of electromagnetism.

In view of the foregoing, a solution which overcomes the above-described inadequacies and shortcomings in preparing low porosity nonoxide ceramics is desired. In particular, it would be desirable to develop a sintering method of ultrahigh temperature covalent non-oxide ceramics at low temperatures without applied pressure and at very short periods of time.

SUMMARY OF THE INVENTION

Having recognized the shortcomings of the prior art, as one embodiment, a novel sintering method is provided that can produce high density ultrahigh temperature nonoxide ceramics with various grain sizes. The method generally has two concurrent steps: a step of applying an electric field of <100 V/cm through a nonoxide ceramic powder, preferably having an average particle size in microns (about 1-5 microns) or less and more preferably between about 100 and 300 nm; and a step of heating the nonoxide ceramic powder at a temperature below a melting temperature of ceramic, preferably at about ⅓ to ⅘ of the melting temperature of the ceramic. While the invention is applicable to nonoxide ceramics in general, in a preferred embodiment, the ceramic is selected from $B_4C$, $ZrB_2$, $TiB_2$, $Si_3N_4$, SiC, BN or combinations thereof. In one embodiment, the invention relates to a method of sintering boron carbide ($B_4C$) ceramics at 700-800° C. under controlled atmospheres with electric field intensities of less than 100 V/cm, resulting in greater than 95% sintered density within minutes.

Ceramics prepared according to the present invention find a wide range of applications. For example, ceramics composed of $B_4C$ exhibits a very high modulus of elasticity, melting temperature and low thermal expansion coefficient. Therefore, it has many important applications which include cutting tool bits for cutting of hard materials, protective coatings, wear resistance, and next generation ballistic armor applications to name a few. Another example of Ultra High Temperature Ceramics (UHTC) is $ZrB_2$, which can be incorporated into rocket propulsion systems, hypersonic flight and several other aerospace applications.

In one aspect of the present invention there is provided a novel method for sintering ultrahigh melting temperature covalent nonoxide ceramics with low porosity. The method comprises applying an electric field of less than 100 V/cm intensity while maintaining a current below about 2 Amperes prior to the onset of sintering through a ceramic powder, which contains nonoxide ceramic powder, and heating the nonoxide ceramic powder at a temperature below the melting temperature of the ceramic powder.

In some embodiments, the method further includes steps of detecting for the onset of sintering and then increasing the current upon the onset of sintering. In some embodiments, the process of sintering from its onset to completion takes less than about 60 seconds.

In some embodiments, the method further includes prior to the onset of sintering, suppressing the resistive heating attributable to the passage of the current through the ceramic powder. In some embodiments, the resistive heating is suppressed via a dynamic electric field control device. In some embodiments, the resistive heating is suppressed so that the increase in temperature attributable to the resistive heating of the ceramic powder is less than about 80° C.

In some embodiments, the intensity of the electric field is less than about 50 V/cm. In some embodiments, the current is maintained at less than about 1 Amperes prior to the onset of sintering. In some embodiments, the maximum power density after the onset of sintering is less than about 250 watts/cm$^3$.

In some embodiments, the heating and the electric field are applied simultaneously to the ceramic powder. In some embodiments, at least one of the temperature of the heating and the intensity of the electric filed is fixed. In some embodiments, the temperature of the heating is increased at a rate between about 1° C. per minute to about 100° C. per minute. The intensity of the electric filed is increased at a constant rate until the onset of the sintering. In some embodiments, the temperature of the heating is below about 1000° C. In some embodiments, the temperature of the heating is below about 800° C. In some embodiments, the temperature of the heating is below about 600° C.

In some embodiments, the ceramic powder comprises substantially nonoxide ceramic powder. In some embodiments, the ceramic powder comprises at least one member selected from the group consisting of Boron carbide ($B_4C$), Zirconium boride ($ZrB_2$), Titanium diboride ($TiB_2$), Titanium carbide (TiC), Silicon nitride ($Si_3N_4$), Silicon carbide (SiC), Boron nitride (BN), Magnesium diboride ($MgB_2$) and combinations thereof. In some embodiments, the ceramic powder comprises substantially $B_4C$.

In some embodiments, the average particle size of the ceramic power is between about 100 nm and about 300 nm in diameter.

In some embodiments, the method further includes the step of exposing the ceramic powder to a pressure of higher than atmospheric pressure.

In another aspect of the present invention there is provided a composition comprising ultrahigh melting temperature and low porosity ceramics produced according the method described herein.

The present objectives, features and advantages will be apparent from the following detailed description of the invention, which is to be read in conjunction with the accompanying drawings. The scope of the invention will be pointed out in the claims. The following drawings, taken in conjunction with the subsequent description, are presented to enable one of ordinary skill in the art to make and use the invention and to incorporate it in the context of particular applications.

DETAILED DESCRIPTION OF THE INVENTION

Figure 1:
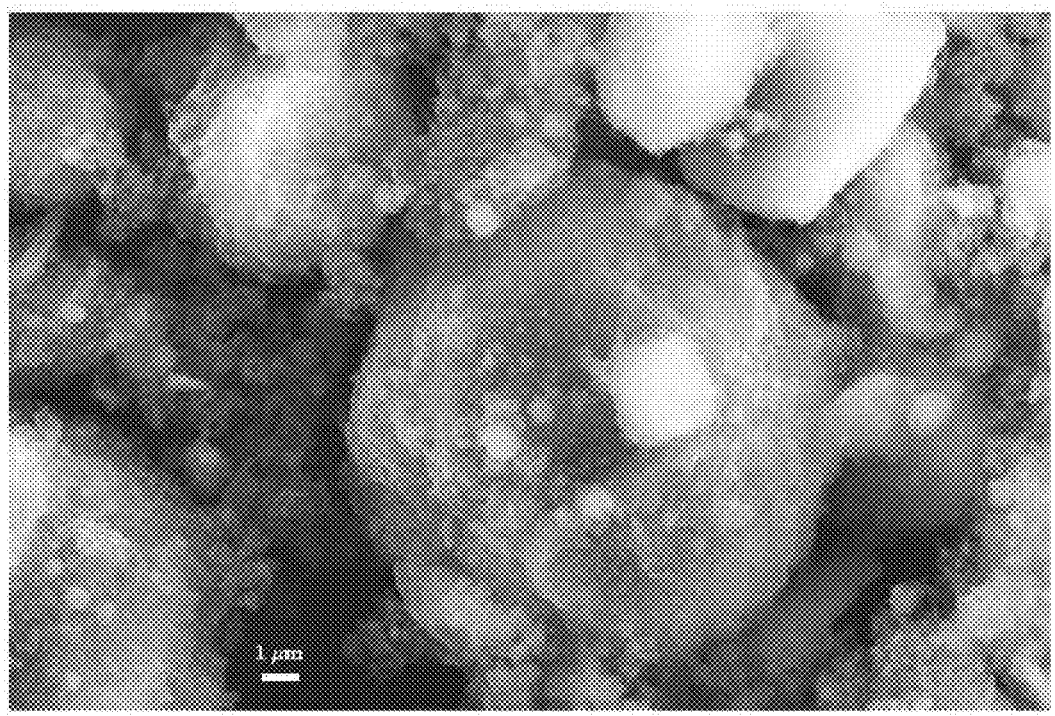
FIG. 1 illustrates a scanning electron microscope image of the commercially available boron carbide ($B_4C$) nanopowder.

Provided herein is a novel method for sintering ultrahigh melting temperature covalent nonoxide ceramics based on a current cut-off limit which enables the very high current densities within a burst of time and based on a choice of the applied electric field according to the conductivity mechanism of the material of interest and its temperature dependence. The method comprises applying an electric field of less than 100 V/cm intensity while maintaining a current below about 2 Amperes prior to the onset of sintering through a ceramic powder, which contains nonoxide ceramic powder, and heating the nonoxide ceramic powder at a temperature below the melting temperature of the ceramic powder.

The method described here has the following general traits: Under a given electric field magnitude, the ceramic powder draws a high current over a small time interval once a certain onset temperature is reached. This time interval is measured in seconds which is one of the major breakthroughs of this invention, i.e. no other known sintering method is as fast as the one described here. The current draw is sudden and leads to a maximum over the said short time interval at which point the current may be cut off. The rise to maximum current is the so-called transient state regime over which densification takes place in seconds in the method described in the invention. The power input to the ceramic powder is limited to less than 280 Watts per centimeter cube in some embodiments. By contrast, Spark Plasma Sinters requires ten times or more power density for sintering.

While the following text may reference or exemplify specific steps of ceramics sintering, it is not intended to limit the scope of the invention to such particular reference or examples. Various modifications may be made by those skilled in the art, in view of practical and economic considerations, such as the size and composition of the particles and the excitation wavelengths of the laser pulses. In order to more clearly and concisely describe the subject matter of the claims, the following definitions are intended to provide guidance as to the meaning of terms used herein.

The various percentage densities (e.g. 95%) as used herein refer to a ratio of the bulk density of ceramics to the theoretical density, which assumes zero porosity in the microstructure of ceramics.

"Current" as used herein refers to the passage of electricity through a conductor such as nonoxide ceramic powder.

"Resistive heating" or "Joule heating" as used herein is the process by which the passage of an electric current through a ceramic material releases heat.

"About" means the referenced numeric indication plus or minus 10% of that referenced numeric indication.

"Sintering" or "Sinter" as used herein refers to a process of exposing a ceramic material to a high temperature (below the melting point of the ceramic material) where mass transport in a particulate body results in a solid object with reduced porosity.

The methods of the present invention, in part, can produce sub-100 nm grain size polycrystalline nonoxide ceramics under better chemical and microstructural control, having high fracture strength, yet low overall fabrication cost. The method in general relies on sintering of the nonoxide ceramic powder, preferably having an average particle size between less than 100 nm and as high as 10 micron. While heating and applying the electric field is done concurrently, it can also be done sequentially.

The electric field can be a direct current (DC) or alternating current (AC) electric field. In some embodiments, the electrical field is applied to the ceramic powder with two electrodes that are electronically conducting. In some embodiments, the electrodes are made from a metal or from an electronically conducting ceramic material.

The method of the present invention utilizes a process of burst mode densification, which is an abrupt and/or instantaneous rise in current immediately before densification or at the onset of sintering. A very high level of density can be reached at the point of maximum current draw. From the onset of sintering till its completion, the heating and the current need to be sustained for only a very short period of time. The actual timeframe for sintering may vary according to the temperature of the heating, the intensity of the electric field, the composition of the ceramic powder, and the setup of the sintering furnace. Non-limiting exemplary timeframes of sintering from its onset to completion according to the present method include less than about 5 minutes, less than about 4 minutes, less than about 3 minutes, less than about 2 minutes, less than about 1 minute, less than about 50 seconds, less than about 40 seconds, less than about 30 seconds, less than about 20 seconds, less than 15 seconds, less than about 10 seconds, less than about 8 seconds, less than about 6 seconds, less than about 4 seconds, less than about 2 seconds, and less than about 1 second. After the completion of sintering, the heating and the current may be reduced or remain constant for a short period of time.

A high level of densification of the ceramics can be achieved within the above mentioned timeframes of sintering. Non-limiting examples of the densities obtained according to the present invention include greater than about 80%, greater than about 85%, greater than about 90%, greater than about 95%, greater than about 98%, and greater than about 99% of the theoretical value. The densification achieved is a transient state phenomenon preceding steady state phenomenon. By contrast, traditional sintering processes such as spark plasma sintering are a steady state phenomenon utilizing Joule heating.

To minimize particle growth, the resistive heating or Joule heating of the ceramic power can be suppressed prior to the onset of sintering. Because local melting at particle-particle contacts may cause increased grain size, a dynamic electric field control device that reduce the impact of resistive heating of the ceramic power can be incorporated to the sintering furnace. Various electric field control device are known in the art, including for example those described in U.S. Pat. No. 8,340,755 and U.S. application Ser. No. 20140139768, the entire disclosure of which is hereby incorporated by reference. Minimized resistive heating contributes to a highly densified polycrystalline material of small grain size according to methods of the present invention. In combination with a suppressing device, the temperature rise attributable to the resistive heating is reduced to very low level at, for example, less than about 80° C., less than about 70° C., less than about 60° C., less than about 50° C., less than about 40° C., less than about 30° C., or less than about 20° C. Because the present invention has little or no interference from resistive hearting or Joule heating and achieves densification in a burst of time, both high densification and low grain size can be obtained at the same time.

Various geometries for one or more capacitors can be used to impose a proper electric field across the ceramic material. For example, parallel plate capacitor geometry enables one to explore a multitude of metal-to-ceramic contact schemes. Meanwhile, the parallel plate capacitor geometry is also amenable for scaled-up production of ceramics.

The advantages of the present invention over previously reported methods also lie in the application of low voltage electric field and low current. Non-limiting examples of the intensity of the electric field applied to the ceramic powder include less than about 200 V/cm, less than about 150 V/cm, less than about 100 V/cm, less than about 90 V/cm, less than about 80 V/cm, less than about 70 V/cm, less than about 60 V/cm, less than about 50 V/cm, less than about 40 V/cm, less than about 30 V/cm, less than about 20 V/cm, less than about 15 V/cm, less than about 10 V/cm, less than about 8 V/cm, less than about 6 V/cm, less than about 4 V/cm, and less than about 2 V/cm. The power input through the ceramic power prior to the onset of sintering is maintained at for example, less than about 30, 20, 10, 9, 8, 7, 6, 5, 4, 3, 2, 1, 0.8, 0.6, 0.4, 0.2, or 0.1 watt/cm$^3$. The level of the current may affect the grain size of the ceramics. The methods of the present invention maintain a low level of current prior to the onset of sintering at, for example, less than about 3, 2, 1, 0.9, 0.6, 0.4, 0.2, or 0.1 Amperes.

The onset of sintering is accompanied by a sudden increase in the power dissipated within the ceramic powder, wherein the power dissipation is manifested as a sudden increase in the current flowing through the material. Exemplary ranges for the power dissipation include about 1 to 1000, 10 to 1000, 100 to 1000, 1 to 900, 1 to 800, 1 to 700, 1 to 600, 1 to 500, 10 to 500, 20 to 500, 30 to 500, 50 to 500, 40 to 500, 60 to 500, 70 to 500, 80 to 500, 90 to 500, 100 to 500, 150 to 500, 200 to 500, 250 to 500, 300 to 500, 350 to 500, 400 to 500 and 450 to 500 watt/cm³. The current may rise after the onset of sintering to, for example, about 5, 6, 7, 8, 9, 10, 11, 12, 13, 14, 15, 16, 17, 18, 19 or 20 Amperes. At the maximum point of the current, the power input through the ceramic powder remains at a low level of, for example, less than about 1000, 900, 800, 700, 600, 550, 500, 450, 400, 350, 300, 250, 200, 180, 160, 140, 120, 100, 90, 80, 70, 60, 50, 40, 30, 20, or 10 watt/cm³. The onset of sintering may also be accompanied by a non-linear increase in the conductivity of the ceramic powder.

Upon the surge of the current at the onset of sintering, the intensity of the electric field may remain constant or increase during the short span of sintering process. An increase in the intensity of the electric field may lead to even higher maximum current draw and thus shorten the sintering process and improve the densification. Of course, depending on the specific ceramic powder, the intensity of the electric field may stay constant or be decreased or cut off to control the current if there is any significant undesirable grain growth. In general, the length of time for the additional boost, if needed, in the electric field intensity (voltage) or the current level on top of the current surge includes for example about less than about 10, 9, 8, 7, 6, 5, 4, 3, 2, and 1 second. In some embodiments, a cut-off of the current after it reaches the maximum point is needed to prevent the steady state regime where Joule heating would take place which is not desired as it causes grain growth. Grain growth is not desired since it worsens the mechanical properties of a given polycrystalline ceramic.

The heating and the electric field may be applied simultaneously or sequentially. At any particular stage of the entire process and for any length of timeframe, including before and after the onset of sintering, the heating and the electric field can be applied to the ceramic powder, independent of any other stage.

The heating and the electric field may change independently of each other. In some embodiments, one or both of the heating and the electric field remain constant before and/or after the onset of sintering. In some embodiments, the heat is increased at a constant rate until the onset of sintering. In some embodiments, the heat is increased at a rate between about 1° C. per minute to about 100° C. per minute (all variations between 1° C. and 100° C. included). Non-limiting examples of the rate of the heat increase include between 1° C. per minute to 10° C. per minute, 10° C. per minute to 20° C. per minute, 20° C. per minute to 30° C. per minute, 30° C. per minute to 40° C. per minute, 40° C. per minute to 50° C. per minute, 50° C. per minute to 60° C. per minute, 60° C. per minute to 70° C. per minute, 70° C. per minute to 80° C. per minute, 80° C. per minute to 90° C. per minute, 90° C. per minute to 100° C. per minute, 1° C. per minute to 50° C. per minute, or 50° C. per minute to 100° C. per minute. In some embodiments, the intensity of the electric filed is increased at a constant rate until the onset of the sintering.

The methods of the present invention enable efficient sintering at a temperature much lower than the melting point of the ceramic powder. In some embodiments, the maximum temperature for the heating is lower than about ⅓ of the melting temperature of the ceramic powder. In some embodiments, the maximum temperature for the heating is lower than about ⅔ of the melting temperature of the ceramic powder. In some embodiments, the temperature is in the range of between about ⅓ to about ⅘ of the melting point of the ceramic powder. Other non-limiting examples for the maximum temperatures of the heating include less than about 1200° C., less than about 1100° C., less than about 1000° C., less than about 950° C., less than about 900° C., less than about 850° C., less than about 800° C., less than about 750° C., less than about 700° C., less than about 650° C., less than about 600° C., less than about 550° C., less than about 500° C., less than about 450° C., and less than about 400° C.

The sintering processes described herein are applicable to a variety of ceramic power including nonoxide ceramic materials as a single substance or as a mixture with other materials. In some embodiments, the nonoxide ceramics is nitride, carbide or boride. Different nonoxide powder can also be mixed in desired proportions if nanocomposites or multiphase systems are desired. In some embodiments, the ceramic powder contains more than about 70%, about 75%, about 80%, about 85%, about 90%, about 95% of nonoxide ceramic powder by weight. Non-limiting examples of suitable nonoxides include Boron carbide ($B_4C$), Zirconium boride ($ZrB_2$), Titanium diboride ($TiB_2$), Titanium carbide (TiC), Silicon nitride ($Si_3N_4$), Silicon carbide (SiC), Boron nitride (BN), Magnesium diboride ($MgB_2$) and combinations thereof. In some embodiments, the ceramic powder may also include oxides such as $Al_2O_3$, MgO, $SrTiO_3$, $SrTiO_3$, and $Co_2MnO_4$. The content of such oxides in the ceramic powder may be less than about 30%, about 25%, about 20%, about 15%, about 10%, about 5%, about 2%, or about 1%. In some embodiments, the ceramic powder for sintering comprises substantially nonoixdes. In some embodiments, the ceramic powder is substantially free of ceramic oxides or contain very minimum amount of ceramic oxides. As a result of the above described manipulation of the ceramic materials, nanocomposites or multiphase systems can be obtained.

The sintering methods of the present invention can be applied to ceramic powder having an average particle size between less than 100 nm and as high as 105 micron in diameter. The particles preferably have axes of approximately the same length (i.e. equiaxed particle shape). In some embodiments, the average particle size ranges between about 100 nm and about 20 micron, between about 100 nm and about 15 micron, between about 100 nm and about 10 micron, between about 100 nm and about 5 micron, between about 100 nm and about 1 micron, between about 100 nm and about 500 nm, between about 100 nm and about 400 nm, between about 100 nm and about 300 nm, between about 100 nm and about 200 nm, between about 50 nm and about 200 nm, between about 50 nm and about 150 nm, between about 50 nm and about 100 nm, between about 10 nm and about 100 nm, and between about 10 nm and about 50 nm. In some embodiments, the average particle size is less than about 10, 20, 30, 40, 50, 80, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450 or 1500 nm in diameter.

The present invention is also amenable to atmosphere control to avoid the decomposition of ceramic materials at high temperatures under ambient conditions. In other embodiments, the methods of the present invention also include exposing the material to higher than atmospheric pressure. In some embodiments, the higher than atmospheric pressure is between 1.5 and 12 MPa. In some embodiments, the higher than atmospheric pressure is between 1.5 and 2.0, 2.0 and 2.5, 2.5 and 3.0, 3.0 and 3.5, 3.5 and 4.0, 4.0 and 4.5, 4.5 and 5.0, 5.0 and 5.5, 5.5 and 6.0, 6.0 and 6.5, 6.5 and 7.0, 7.0 and 7.5, 7.5 and 8.0, 8.0 and 8.5, 8.5 and 9.0, 9.0 and 9.5, 9.5 and 10.0, 10.0 and 10.5, 10.5 and 11.0, 11.0 and 11.5, or 11.5 and 12.0 MPa. In some embodiments, only the normal atmospheric pressure is applied.

In order to further minimize the oxidation of the nonoxide ceramic materials, the sintering process may be conducted in an atmosphere of reduced oxygen content or substantially free of oxygen. The atmosphere may contain nitrogen or other inert gas such as argon.

Also provided in the present invention is a composition comprising ultra-high melting point ceramics with low porosity. Various bulk and composite structural ceramics can be fabricated by forming particulate matter into a desired shape (e.g. pellet, plate, cylinder, ring, sphere, tuber, etc.) and then subject the formed body to the above described sintering conditions to induce densification. The ceramics exhibits a desirable high density at greater than about, for example, 80, 81, 82, 83, 84, 85, 86, 87, 88, 89, 90, 91, 92, 93, 94, 95, 96, 97, 98, 99 or 100% of the theoretical density. The small grain size of the polycrystalline ceramics also contributes to favorable physical properties such as high fracture strength. Non-limiting examples of the grain size (diameter) of the sintered ceramics include less than about 6 um, less than about 5 um, less than about 4 um, less than about 3 um, less than about 2 um, less than about 1 um, less than about 900 nm, less than about 800 nm, less than about 700 nm, less than about 600 nm, less than about 500 nm, less than about 400 nm, less than about 300 nm, less than about 200 nm, less than about 100 nm, less than about 90 nm, less than about 80 nm, less than about 70 nm, less than about 60 nm, less than about 40 nm, less than about 30 nm, less than about 20 nm, and less than about 10 nm. In comparison with the ceramic powder, the sintered ceramics has no or very little particle growth. Exemplary embodiments of the particle growth include less than about 30%, less than about 25%, less than about 20%, less than about 15%, less than about 10%, and less than about 5%.

In one exemplary embodiment, the ceramic powder is placed in a furnace and electric field intensity of <100 V/cm is applied in the parallel plate capacitor geometry. The parallel plate capacitor geometry enables a multitude of metal-to-ceramic contact schemes in imposing the proper electric field across the specimen. The ceramic powder is heated with a constant heating rate. The current across the specimen as well as the temperature is also preferably measured. The temperature of the sample will reach a temperature governed by the applied field magnitude and the temperature of the furnace in which it is placed, e.g. 700-800° C. for $B_4C$ with the current peak of about 7-10 Ampere. At this point the voltage is reduced to limit the current or the current is turned off and the sample is cooled, typically to room temperature. In a preferred embodiment, a dynamic electric field control is used to suppress resistive heating prior to reaching the critical temperature for burst-mode densification. In such embodiment, the particle growth is suppressed before sintering (densification) takes place. The density of the specimen reaches >95% of theoretical at the point of maximum current draw. In contrast, samples heated to the same temperature with the same heating rate show no densification when electric field is not applied.

Without being bound by theory, sintering is induced by the electric current passing through the sample and not the applied electric field per se observed in flash sintering. Indeed, oxides are poor conductors and the flash occurs at a critical field (temperature dependent) at which a cascade or avalanche of charged defects is formed. In conducting nonoxides, the flash does not occur and a field cannot be sustained to make such an effect happen. The disclosed method also shows no appreciable joule heating and the increase in the specimen temperature is modest, i.e. 60° C. It is believed that the electric field's role in the disclosed method is to induce a large current in the system at a certain temperature which is dependent on the magnitude of the applied field. Densification of the nonoxide particulate system takes place due to the current passing through the system. In other words, the disclosed method exploits the intrinsic conductivity of the nonoxide ceramic where densification is driven by the current. Since the disclosed method is based on current driven densification, no avalanche mechanism can be responsible for the observed densification Moreover, no grain growth occurs even at very high current densities resulting with a highly densified polycrystalline material of small grain size. It is believed that the lack of grain size is a consequence of the conductive nature of the materials of interest in the disclosed method and the lack of local melting at particle-particle contacts.

The examples set forth below also serve to provide further appreciation of the disclosed invention, but are not meant in any way to restrict the scope of the invention.

EXAMPLES

Example 1

The sintering experiments were carried on Busch campus, in the department of Materials Science and Engineering at Rutgers University. The $B_4C$ nanopowder of ~100-300 nm average particle size and of equiaxed particle shape was purchased from Picatinny Arsenal, Rockaway Township, N.J. The powder was placed in a furnace and electric field intensity of <100 V/cm was applied in the parallel plate capacitor geometry.

The sample was heated with a constant heating rate and the current across the specimen as well as the temperature was measured. The temperature of the sample reached a specific temperature of about 700-800° C. and the current through the sample was 7-10 Amperes. At this point the current was switched to a constant current operational mode and the current was limited to protect the sample and platinum electrodes. After a short period of time, the power supply was turned off and the current through the sample was ceased. The heating element was then turned off and the sample was cooled to room temperature.

The density of the specimen prepared above reached >95% of theoretical at the point of maximum current draw through a process of burst mode densification, which is an abrupt and/or instantaneous rise in current immediately before the densification. Samples heated with no applied electric field to the same temperature with the same heating rate show no densification. Additionally, samples heated with an applied electric field with the same heating rate but to temperatures where no current is observed show no densification. This leads us to believe that sintering was induced by the electric current passing through the sample and not the applied electric field per se thus distinguishing this process from what is known as flash sintering.

The method described in Example 1 differs from spark plasma sintering as no appreciable joule heating was observed due to the short time frames involved. The increase in the specimen temperature was modest, i.e. 60° C., which means the observed densification was not due to Joule heating. As there was no Joule heating in the process disclosed in Example 1, the invention differs from Spark Plasma Sintering where currents of 100-10000 Amperes are used at 100-1 volts.

Example 2

Figure 2:
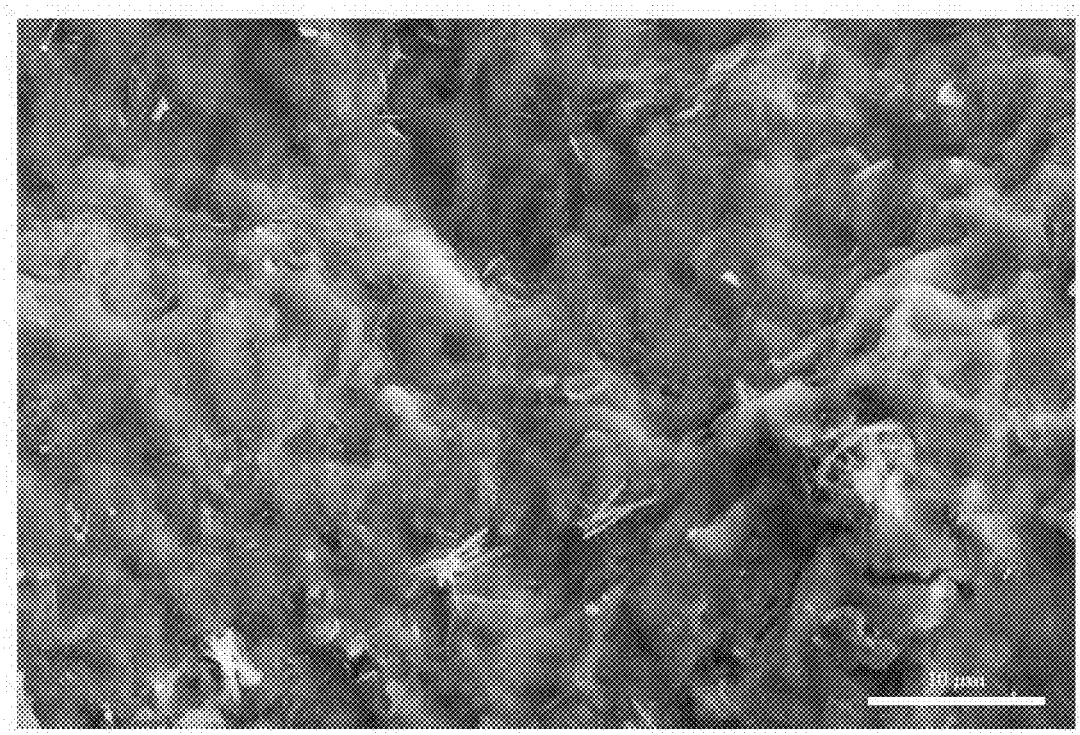
FIG. 2 illustrates a scanning electron microscope image of the sintered boron carbide ($B_4C$) microstructure prepared using a Spark Plasma Sintering (SPS). The SPS microstructure shows partial melting, which is generally considered detrimental to mechanical properties of ceramics.

In order to compare the nonoxide ceramics prepared in accordance with the disclosed process to those prepared based on the processes (e.g. Spark Plasma Sintering) known in the art, the $B_4C$ nanopowder of ~100-300 nm average particle size, identical to the powder from Example I, was placed in a furnace and current >100 Amps was applied. The temperature was raised above 1000° C. in a controlled atmosphere for at least 10-100 times longer than the disclosed methods described in Example 1. FIG. 2 illustrates a scanning electron microscope image of the sintered boron carbide ($B_4C$) microstructure prepared using a Spark Plasma Sintering (SPS).

Example 3

Figure 3:
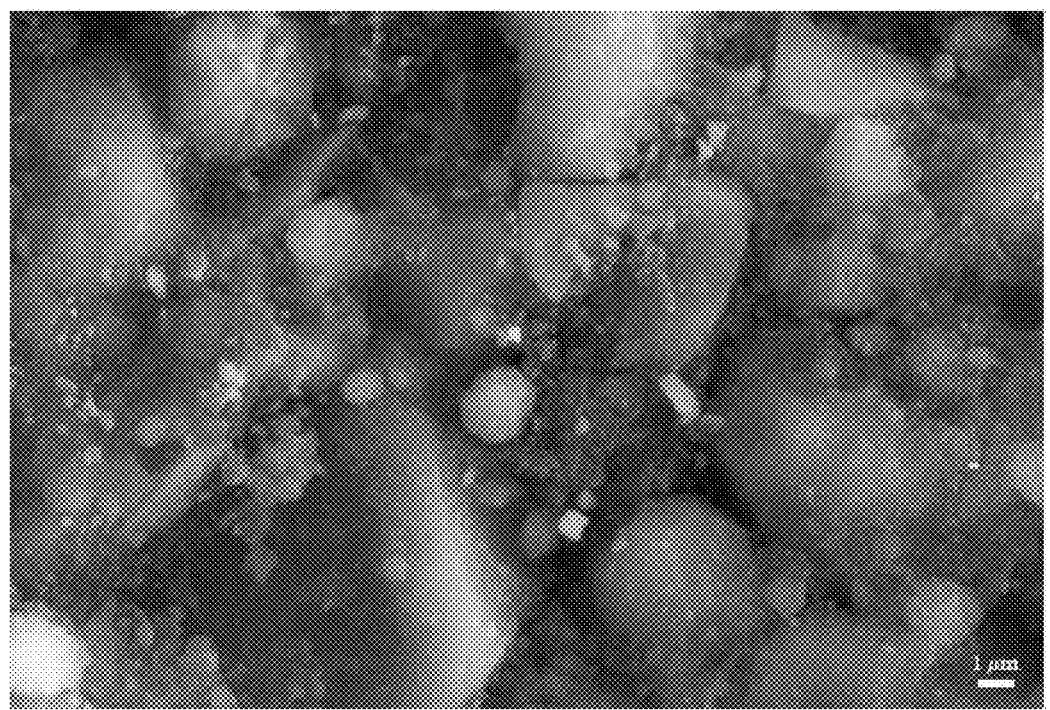
FIG. 3 illustrates a scanning electron microscope image of the sintered boron carbide ($B_4C$) microstructure prepared using the disclosed low electric sintering method. The microstructure is ~97dense (obtained with E=38 V/cm, max. current 10.0 Amperes) and compares favorably with the one obtained by SPS as shown in FIG. 2. In contrast to the SPS microstructure, no melting is observed.

The microstructure of the ceramics obtained in Example 1 (see FIG. 3) were compared to ceramics obtained in Example 4. The ceramic produced using the disclosed method was ~97% dense (obtained with E=38 V/cm, max. current 10.5 Amperes) and compared favorably with the one obtained by SPS (see FIG. 2). SPS microstructure also showed partial melting whereas the microstructure of Example 1 did not. Partial melting is generally considered detrimental to mechanical properties of ceramics.

Joule heating is one form of providing thermal heat to induce mass transport. In this case, thermal heat is produced by passing a current through a resistive medium. In order to obtain densification through Joule heating one must sufficiently heat the entire sample thereby inducing mass transport throughout the full volume of the sample. The temperature was measured using a thermocouple in close vicinity of the sample described in Example 1. The increase of temperature observed was too small and happened too quickly to consider uniform joule heating of the sample. Furthermore, no conventional (thermally activated) mass-transport mechanism can explain the abnormally short densification times when a proper electric field is used while the sample is being heated.

The inventors wish to point out that the densification is not due to joule heating as the measured temperature rise is only 60° C. when the current peaks at 10 Amperes—the maximum current we have used to date. While the exact mechanism for densification remains to be discovered (the same applies for flash sintering of oxide ceramics), what we know with certainty is that densification in $B_4C$ particulate matter can be induced <1000° C. In an experiment using the method of the present invention, a 95% density is achieved in 12 seconds which compares most favorably to hot pressing at 1900° C. for ~40 hours. The small increase in temperature and the small electric currents used in the invention described herein also differentiates it from what is called spark plasma sintering which utilizes currents of approximately 1000 Amperes resulting in massive Joule heating.

Example 4

Figure 4:
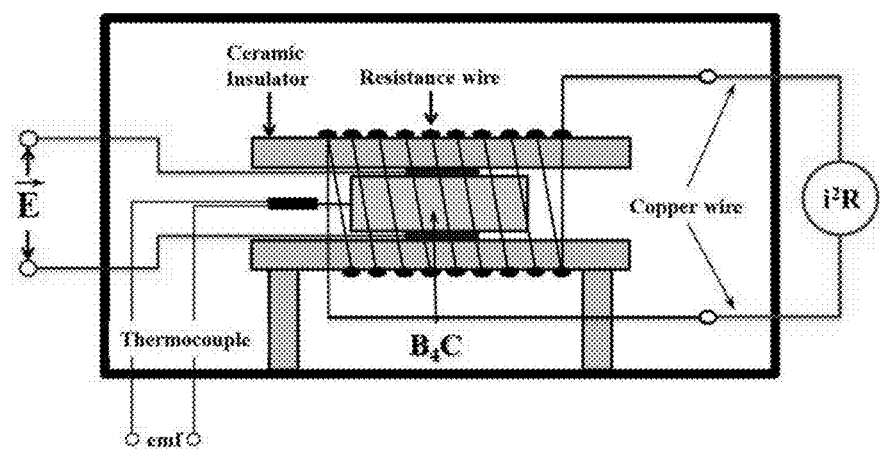
FIG. 4 illustrates a parallel plate capacitor configuration used in this invention for applying the electric field and inducing a transient current draw by the specimen of interest by which sintering is accomplished.

The method developed by the inventors, the specimen (a porous powder compact that is shaped by uniaxial pressing of approximately 55-65% relative density) was heated with a constant heating rate in a furnace while a dc electric field was applied to it as shown in FIG. 4. This configuration is the so-called parallel plate capacitor geometry where the direction of the applied electric field is perpendicular to the specimen surface. The configuration described in FIG. 4 and its spin-off configurations are very suitable for scaling up the process as most applications of the material of interest require to sintering of large area plates of uniform thickness. The thickness of the specimen determined the magnitude of the electric field applied to the specimen. The specimen was sandwiches between two conductor sheets and/or wires whereby electrical contact was established and by which a uniform electric field was maintained. The specimen was then resistively heated by the heating elements.

Example 5

Figure 5:
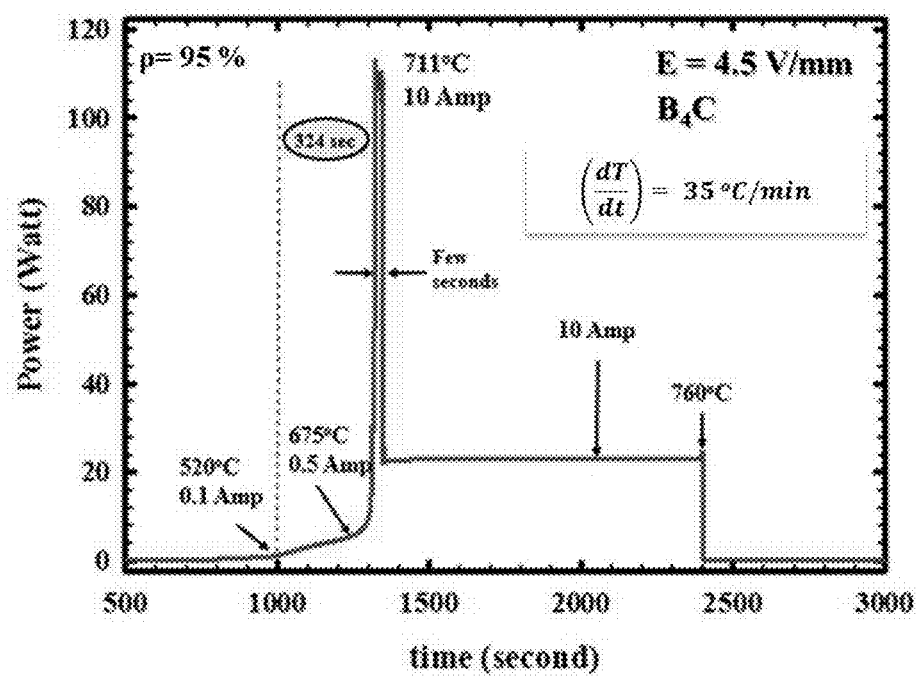
FIG. 5 illustrates power-time relation for sintering of $B_4C$ under 4.5 V/mm applied electric field and 35° C./min heating rate.

A typical power versus time response of $B_4C$ under an electric field of 4.5 V/mm is shown in FIG. 5. The power input to the specimen was limited to 120 Watts making the method a low power technique in contrast to Spark Plasma Sintering. Here, the power absorbed by the specimen was plotted as a function of time while specimen was heated with 35° C./min under an applied field of 4.5 V/mm. The first current draw started at 520° C. which was followed by the onset at 675° C. The power absorption by the specimen peaked at 10 Amperes (cut-off) within approximately 24 seconds at which point the specimen temperature reached 711° C. which we designate as the sintering temperature. The density of the specimen reaches 95% at cut-off. The electric field is then reduced while maintaining the current across the specimen for a long time which was to prove that no grain growth took place as joule heating was suppressed. The range of interest responsible for sintering was 675-711° C.

Example 6

Figure 6:
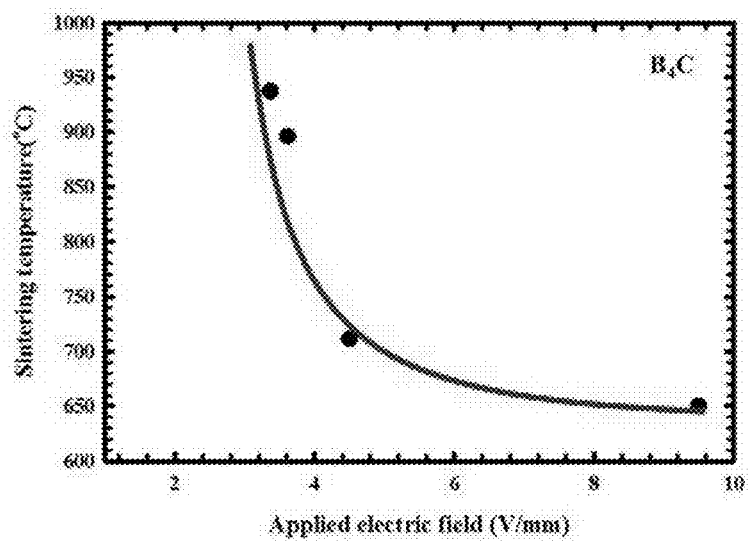
FIG. 6 illustrates data showing the inverse relationship between applied electric field and sintering temperature for $B_4C$ using the method described herein, where the maximum current cut-off was limited to 10 Amperes.

FIG. 6 illustrates the inverse relationship between the applied electric field and the sintering temperature for $B_4C$ using the methods of the present invention. As shown in the figure, there exists an inverse relationship between the applied electric field and onset temperature as well as sintering temperature which is substantial, i.e. the higher the applied electric field, the lower the sintering temperature as shown in FIG. 6. Once the current draw began for a given applied electric field and temperature, it rose to a maximum.

Example 7

According to methods of the present invention, $B_4C$ was sintered at temperatures as low as 650° C. in approximately under 9.5 V/mm to 94% density at power densities of 450 Watt/$cm^3$ or less which is a fundamental breakthrough of this invention. The power density was used up by the system (the $B_4C$ ceramic) for densification in <1 minutes time which is the second breakthrough of this invention. The usable electric field range for densification using the method described here was 3 V/mm-10 V/mm. The current cut-off used by the inventors was 10 Amperes.

Figure 7:
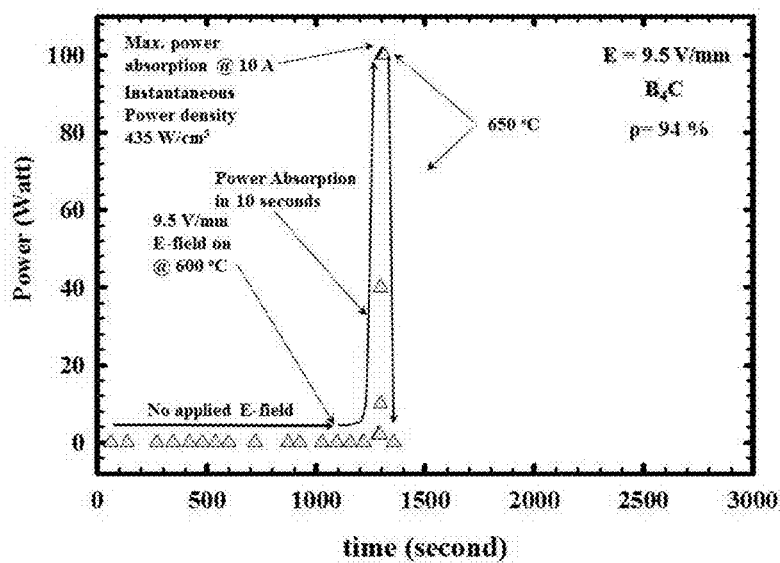
FIG. 7 illustrates the power-time relationship for $B_4C$ sintered under an applied electric field of 9.5 V/mm resulting in sintering to 94% density at 650° C.
Figure 8:
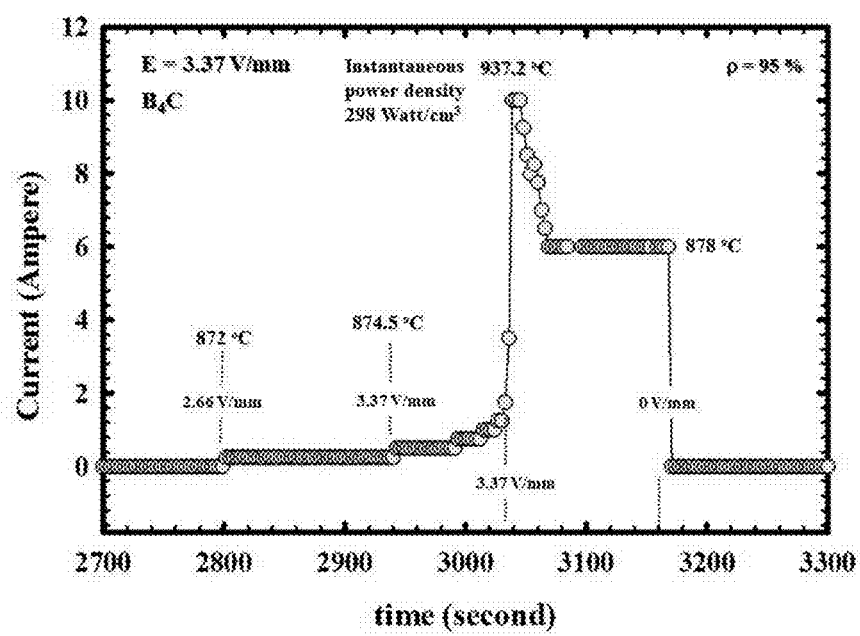
FIG. 8 illustrates the current-time relationship for $B_4C$ sintered under an applied electric field of 3.4 V/mm resulting in sintering to 95% density at 937° C.

FIG. 7 depicts the power-time relationship for $B_4C$ sintered under an applied electric field of 9.5 V/mm resulting in sintering to 94% density at 650° C. This temperature is the lowest temperature obtained in this invention. The sintering time was 10 seconds which was also the shortest time obtained in this invention. This data proves that increasing the electric field reduces both the sintering temperature and time. FIG. 8 shows the current-time relationship for $B_4C$ sintered under an applied electric field of 3.4 V/mm resulting in sintering to 94% density at 937° C. This applied electric field was the lowest one used to obtain 95% density.

It will be appreciated by persons skilled in the art that the present invention is not limited to what has been particularly shown and described. Rather, the scope of the present invention is defined by the claims which follow. It should further be understood that the above description is only representative of illustrative examples of embodiments. The description has not attempted to exhaustively enumerate all possible variations. The alternate embodiments may not have been presented for a specific portion of the invention, and may result from a different combination of described portions, or that other un-described alternate embodiments may be available for a portion, is not to be considered a disclaimer of those alternate embodiments. It will be appreciated that many of those un-described embodiments are within the literal scope of the following claims, and others are equivalent. Furthermore, all references, publications, U.S. Patents, and U.S. Patent Application Publications cited throughout this specification are hereby incorporated by reference as if fully set forth in this specification.

The invention claimed is:

1. A method of producing ultra-high melting point ceramics, comprising exposing a ceramic powder to an electric field of less than about 150 V/cm intensity, said ceramic power comprising greater than about 80% of nonoxide ceramic powder, wherein the average particle size of the ceramic powder is between about 10 nm and about 3000 nm in diameter;
maintaining a current below about 2 Amperes through said ceramic powder prior to the onset of sintering, wherein the onset of sintering is characterized by a power dissipation in the range of about 1 to 200 watts/cm$^3$;
heating the ceramic powder at a temperature below about ⅓ of the melting point of the ceramic powder; and
maintaining a current of less than 20 Amperes after the onset of sintering till the completion of sintering, wherein the power density is less than about 500 watts/cm$^3$.

2. The method of claim 1, further comprising detecting for the onset of sintering;
and increasing the current or the intensity of the electric field upon the onset of sintering.

3. The method of claim 1, wherein the timespan of sintering from its onset to completion is less than about 60 seconds.

4. The method of claim 1, further comprising prior to the onset of sintering, suppressing the resistive heating attributable to the passage of the current through the ceramic powder.

5. The method of claim 4, wherein the resistive heating is suppressed via a dynamic electric field control device.

6. The method of claim 4, wherein the resistive heating is suppressed so that the increase in temperature attributable to the resistive heating of the ceramic powder is less than about 80° C.

7. The method of claim 1, wherein the intensity of the electric field is less than about 100 V/cm.

8. The method of claim 1, wherein the current is maintained at less than about 1 Amperes prior to the onset of sintering.

9. The method of claim 1, wherein the maximum power density after the onset of sintering is less than about 250 watts/cm$^3$.

10. The method of claim 1, wherein the heating and the electric field are applied simultaneously to the ceramic powder.

11. The method of claim 1, wherein at least one of the temperature of the heating and the intensity of the electric filed is fixed.

12. The method of claim 1, wherein the temperature of the heating is increased at a rate between about 1° C. per minute to about 100° C. per minute.

13. The method of claim 1, wherein the intensity of the electric filed is increased at a constant rate until the onset of the sintering.

14. The method of claim 1, wherein the temperature of the heating is below about 1000° C.

15. The method of claim 1, wherein the ceramic powder comprises substantially nonoxide ceramic powder.

16. The method of claim 1, wherein the ceramic powder comprises at least one member selected from the group consisting of Boron carbide (B$_4$C), Zirconium boride (ZrB$_2$), Titanium diboride (TiB$_2$), Titanium carbide (TiC), Silicon nitride (Si$_3$N$_4$), Silicon carbide (SiC), Boron nitride (BN), Magnesium diboride (MgB$_2$) and combinations thereof.

17. The method of claim 1, wherein the ceramic powder comprises substantially B$_4$C.

18. The method of claim 1, wherein the average particle size of the ceramic power is between about 100 nm and about 300 nm in diameter.

19. The method of claim 1, further comprising exposing the ceramic powder to a pressure of higher than atmospheric pressure.

* * * * *